United States Patent [19]
Woodard

[11] Patent Number: 5,949,329
[45] Date of Patent: Sep. 7, 1999

[54] BOAT LOADING GUIDANCE DEVICE

[76] Inventor: Willie J. Woodard, 607 Crowell St., Wilson, N.C. 27893

[21] Appl. No.: 08/664,739

[22] Filed: Jun. 17, 1996

[51] Int. Cl.$^6$ .................................................. G08B 21/00
[52] U.S. Cl. ......................... 340/431; 340/686; 340/687; 340/984; 116/28 R; 280/414.1
[58] Field of Search ........................ 114/344; 280/414.1, 280/508; 414/529–536, 584; 340/431, 687, 686, 958, 984, 985; 116/28 R, 202

[56] References Cited

U.S. PATENT DOCUMENTS

| | | | |
|---|---|---|---|
| 2,927,310 | 3/1960 | Knapp | 340/431 |
| 3,237,177 | 2/1966 | Sparks et al. | 340/431 |
| 3,418,628 | 12/1968 | Fenner | 340/431 |
| 3,901,536 | 8/1975 | Black | 340/431 |
| 5,097,250 | 3/1992 | Hernandez | 340/686 |
| 5,596,944 | 1/1997 | Massie | 340/431 |

*Primary Examiner*—Jeffery Hofsass
*Assistant Examiner*—Timothy Edwards, Jr.
*Attorney, Agent, or Firm*—Mills Law Firm; Clifford F. Rey

[57] ABSTRACT

A boat loading guidance device including an array of indicator lamps which signals the boat operator when a boat has been maneuvered into correct longitudinal alignment with a submerged boat trailer. In the preferred embodiment a pair of actuating arms are angularly disposed to form a V-shape and adapted to engage the bow of a boat at the forward end of the boat trailer. Upon contact with the bow of a boat, the actuating arms close an associated switch passing electrical current by a plurality of circuits to either a port or starboard indicator lamp informing the boat operator of the direction in which the boat must be maneuvered into correct alignment with the trailer. In one embodiment, the boat loading guidance device is adapted to receive power from the battery of a towing vehicle by way of an existing trailer wiring harness. In an alternative embodiment, the device is self-powered by a plurality of dry cell batteries for supplying electric power to the lamp circuits. The boat loading guidance device is provided in kit form and adapted for attachment to an existing boat trailer with no modification or changes to the existing boat trailer wiring.

12 Claims, 2 Drawing Sheets

BOAT LOADING GUIDANCE DEVICE

BACKGROUND OF INVENTION

1. Field of Invention

This invention relates to guidance devices for use in loading a boat onto a trailer and, more particularly, to a signal device for guiding a boat into proper alignment with the trailer.

Boat trailers for transporting small boats are well known to those skilled in the art. When transferring a boat from the water onto a trailer, it is necessary to maintain the boat in longitudinal alignment with the trailer as the boat is drawn forwardly onto the same to properly center the boat thereon. This boat loading process is more difficult at night when the trailer is submerged in water and is not readily visible.

Thus, the present invention has been developed to provide a boat loading guidance device mounted on the front end of the trailer which provides a light signal that indicates the longitudinal aligment of the boat relative to the trailer.

2. Description of the Related Art

U.S. Pat. No. 3,418,628 discloses an alignment device for trailers for guiding a motor vehicle having a trailer hitch into proper alignment with a trailer having a coupling member.

U.S. Pat. No. 3,831,790 to Edward Farris disclosing a boat loading and unloading kit including guide arms for attachment to a boat trailer for facilitating the loading and unloading of a boat therefrom.

U.S. Pat. No. 4,187,494 to John W. Jessee discloses a trailer guidance system to facilitate the positioning of a towing vehicle with respect to a towed vehicle whereby hitch components on the vehicles are properly positioned for connecting the vehicles.

U.S. Pat. No. 2,827,304 to Charles H. Backus discloses a mechanical guide means mounted on the rear end of a trailer for maintaining a boat in a longitudinally aligned position as it is being drawn forwardly by a winch from the water onto such trailer.

U.S. Pat. No. 3,731,274 to Lawrence Green discloses a guiding light system in the form of signal lamps which show the driver of towing vehicle whether or not it is backing directly toward the hook-up position to attach a trailer coupling.

U.S. Pat. No. 4,958,436 to Carl J. Tusche discloses a trailer hitch guide device that includes a plurality of visual guides that are flexibly mounted on a trailer in a pattern that can be used to align and orient a vehicle with respect to the trailer hitch elements in a plurality of planes.

U.S. Pat. No. 5,097,250 to David Hernandez discloses an electronic trailer guide which includes sensors and associated logic and display circuitry that serve to present information to the driver of a towing vehicle as to the direction in which he must turn the steering wheel of the towing vehicle to back a trailer into a desired position.

U.S. Pat. No. 2,927,310 to Russell G. Knapp discloses a trailer warning signal device which will signal the driver when the angle between a tow car a trailer exceeds a predetermined degree and which will also indicates the direction of angular deviation between the two vehicles.

Finally, U.S. Pat. No. 4,733,833 to Gordon J. Shepherd is considered of general interest in that it discloses an aircraft docking system including a plurality of load sensors embedded in the surface of an airport apron. An aircraft approaching along the correct path will cause a plurality of light signals to be sequentially illuminated.

SUMMARY OF INVENTION

After much research and study into the above mentioned problems, the present invention has been developed to provide a boat loading guidance device which provides a visual reference in the form of a light signal to the boat operator indicating the relative position of the boat in relation to the trailer as it is being loaded onto the trailer.

The boat loading guidance device of the present invention includes a pair of elongated, actuating anus disposed to form a V and adapted to contact the bow of a boat as it approaches the proper location in alignment with the boat trailer.

When the bow of the boat contacts either actuating arm, a mechanical switch is activated passing electrical current through attached wiring to an array of indicator lamps mounted adjacent the front end of the trailer and above the bow to provide a visual reference for the boat operator.

Thus, if the boat is misaligned to the left side of the boat when facing forward, the left or port indicator lamp is illumninated. Similarly, if the boat is misaligned to the right side of the boat, the right or starboard indicator lamp is illuminated.

In this manner, the boat operator may guide the vessel into proper longitudinal alignment with a submerged trailer without the assistance of a person on shore giving directions or even at night when visibility is limited.

In view of the above, it is an object of the present invention to provide a boat loading guidance device including a pair of actuating arms being adapted to engage the bow of a boat as it is positioned on a trailer. Contact with the bow of a boat closes a mechanical switch which passes electrical current to an array of indicator lamps providing a visual reference to the boat operator as to the relative position of the vessel to the boat trailer.

Another object of the present invention is to provide a boat loading guidance device which may be connected to the pre-existing boat trailer light circuit with no modifications to the stock equipment or changes to the pre-existing wiring.

Another object of the present invention is to provide a boat loading guidance device which enables the boat operator to position a boat in proper longitudinal alignment with a trailer at night during limited visibility.

Another object of the present invention is to provide a boat loading guidance device which functions to prevent damage to the boat hull and also to the towing vehicle resulting from the collision between the submerged trailer and boat as it is loaded thereon.

Other objects and advantages of the present invention will become apparent and obvious from a study of the following description and the accompanying drawings which are merely illustrative of such invention.

DETAILED DESCRIPTION OF INVENTION

Figure 1:
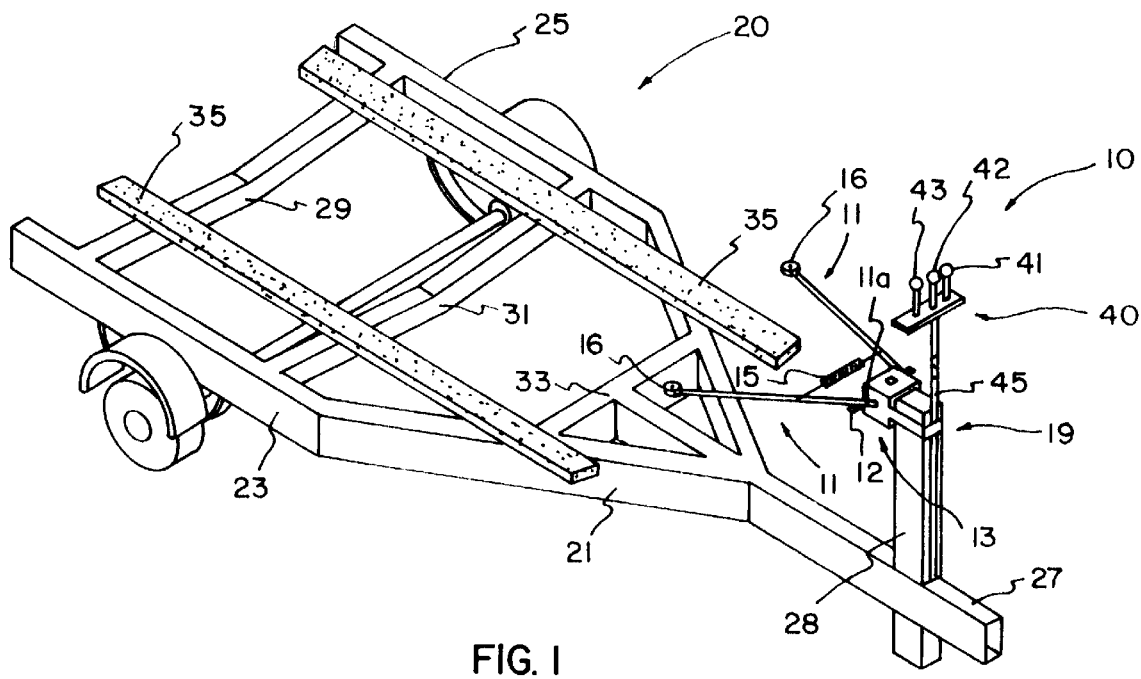
FIG. 1 is a perspective view of a conventional boat trailer showing the boat loading guidance device of the present invention mounted thereon.

With reference to the drawings, the boat loading guidance device in accordance with the present invention is illustrated in FIG. 1 and indicated generally at 10. The boat loading guidance device of the present invention is shown installed in its function position on a conventional boat trailer, indicated generally at 20.

Before describing the boat loading guidance device of the present invention in detail, it may beneficial to review the structure of the conventional boat trailer 20 whereon the present invention is installed in its functional position.

Trailer 20 includes a main frame 21 comprised of a pair of horizontally opposed, lateral support members 23 and 25 which converge inwardly at a forward end of the trailer 20 to form a tongue member 27 which is adapted for attachment to a towing vehicle (not shown).

The main frame 21 includes a plurality of transverse brace members 29 and 31 being attached thereto by weldment or other suitable fastening means. The transverse members 29 and 31 are generally V-shaped and disposed symmetrically on a longitudinal center line of trailer 20 in order to accommodate the V-shaped bow of boat 50, which is transported thereon. Trailer 20 also includes a transverse reinforcing member 33.

Trailer 20 includes a pair of elongated, generally rectangular runners 35 which are longitudinally disposed in generally parallel relation to a center line of a trailer 20. Runners 35 function to support the hull of a boat when loaded onto the trailer 20.

Since such conventional boat trailers are well known to those skilled in the art, further detailed discussion of the same is not deemed necessary.

Turning now to the present invention, the details of the construction and operation of the boat loading guidance device 10 will be described.

In the preferred embodiment the major components of the boat loading guidance device 10 are a pair of actuating arms, indicated generally at 11; a control box, indicated generally at 13; a coil spring 15; an indicator light module, indicated generally at 40; and a mounting bracket, indicated generally at 19.

Actuating arms 11 are disposed in V-shaped fashion being pivotally mounted in a horizontal plane adjacent the proximal ends 11a thereof at control box 13.

Figure 2:
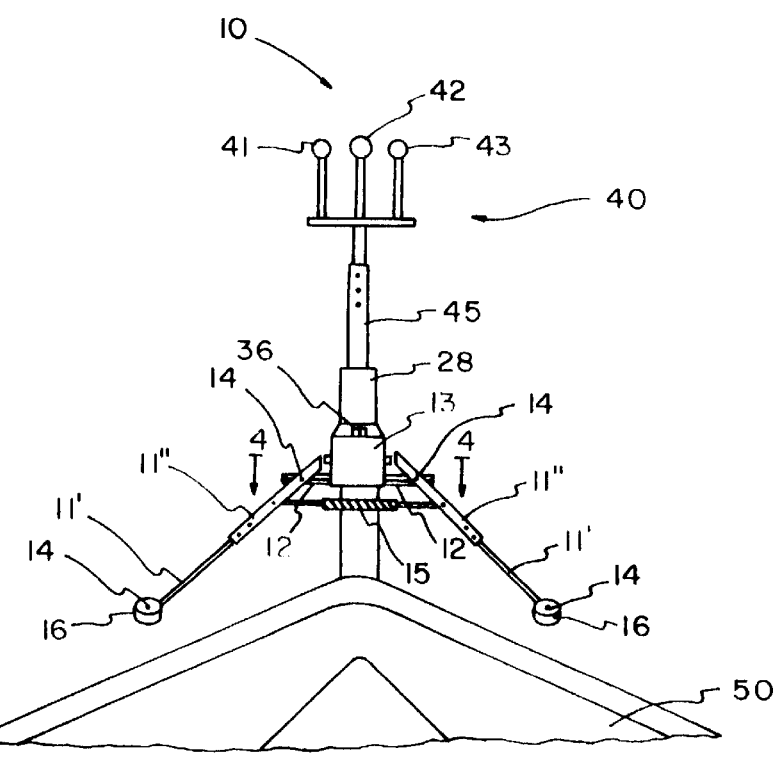
FIG. 2 is a perspective view of the boat loading guidance device of the present invention as seen from a boat being loaded onto a boat trailer.

Arms 11 are pivotally received in brackets 12 by means of pivot pins 14 as more clearly shown in FIG. 2.

Figure 4:
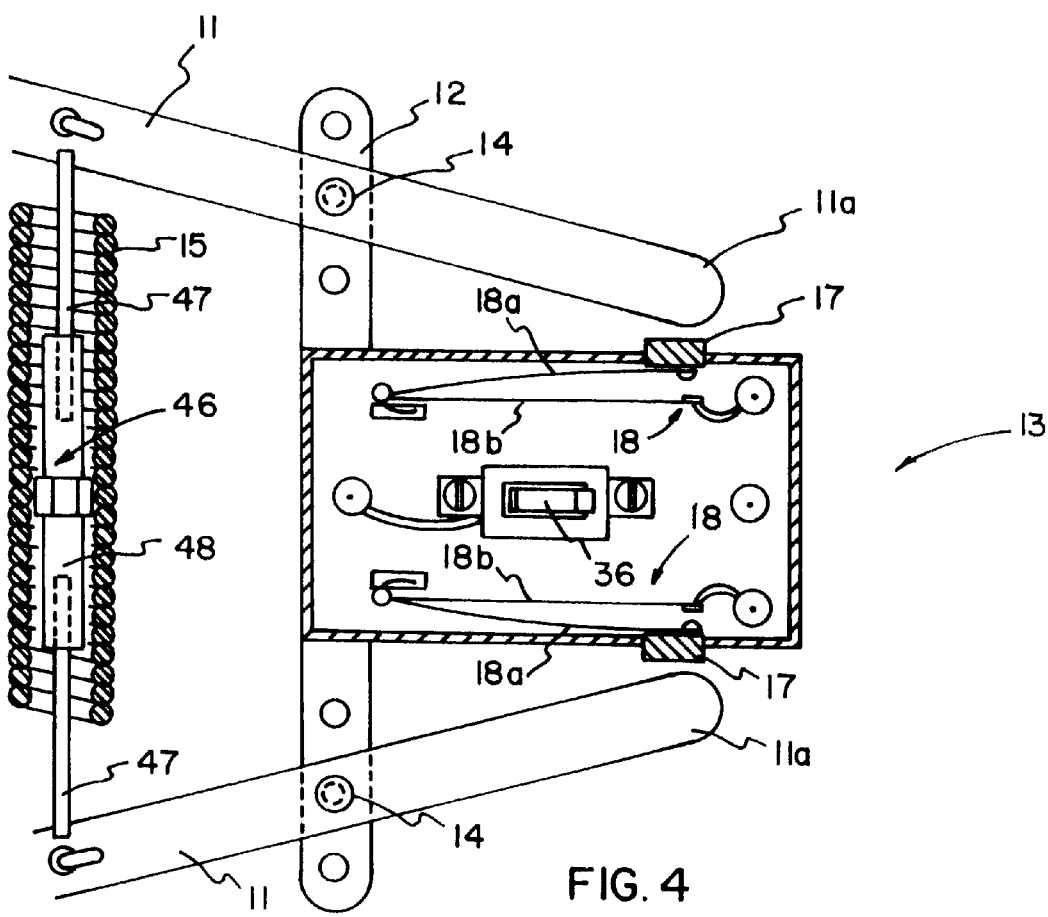
FIG. 4 is a sectioned plan view taken along line 4—4 of FIG. 2 showing details of the control box and actuating arms.

Coil spring 15 is fixedly attached to each respective actuating arm 11 at point distal to the pivoting connection of arms 11 at brackets 12 and extends transversely therebetween so as to spring bias the actuating arms 11 in an inward direction as more clearly shown in FIG. 4.

Actuating arms 11 are each provided with a contact roller 16 being pivotally mounted at the terminal ends thereof by pivot pins 14 or other suitable fasteners.

The proximal ends 11a of actuating arms 11 are adapted for contact with a pair of mechanical switches, indicated generally at 18, which are disposed on either side of control box 13 in functional relation with the proximal ends 11a of actuating arms 11.

The switches 18 located in the control box 13 are basically flexible blade switches which are each constructed of two blades 18a and 18b respectively. Each switch 18 is closed when its two flexible blades 18a and 18b are brought together in contact by a respective actuating arm 11 which engages an associated push-button 17 as shown in FIG. 4.

Since such mechanical switches are well known to those skilled in the art, further detailed discussion of the same is not deemed necessary.

A main power switch 36 is also enclosed within control box 13 which permits electric current to pass to a center mounted target lamp 42 located in the indicator lamp module, indicated generally at 40. Main power switch 36 also functions to permit electric current to pass to the left side or port indicator lamp 41 and to the right side or starboard indicator lamp 43 when their respective switches 18 are closed.

In an alternative embodiment (not shown), main power switch 36 may be omitted and electric current is applied directly to target lamp 42 whenever the power supply is connected as hereinafter described.

Figure 3:
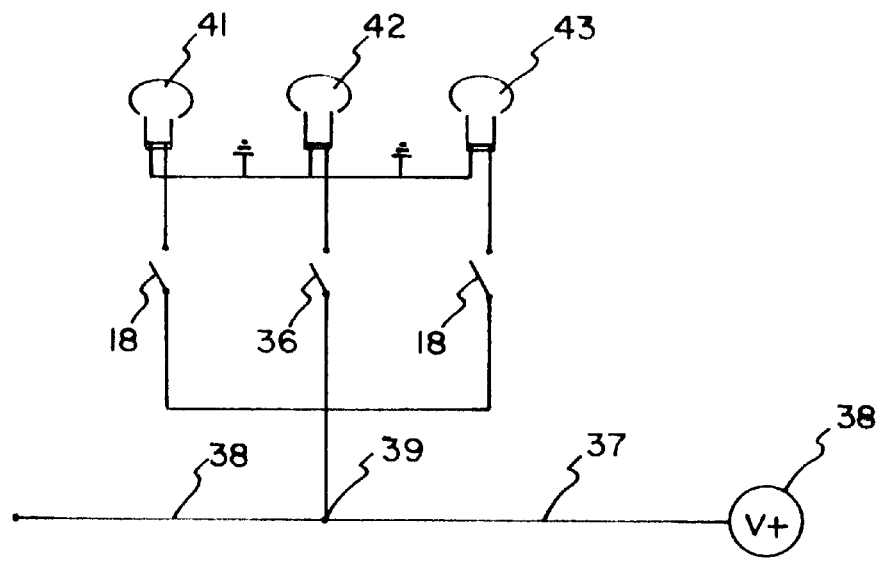
FIG. 3 is a simplified schematic wiring diagram of the present invention.

Referring to FIG. 3, there is shown therein a schematic wiring diagram of the present invention. It can be seen that each pair of switches and lights is independently actuable since each pair is joined in parallel across the power source 38.

In the preferred embodiment the standard 12 volt battery (not shown) of the towing vehicle provides electric current by way of an existing trailer harness circuit 37 for illuminating the trailer brake lamp circuit 38 as shown in FIG. 3.

Thus, the present invention may be electrically connected by way of a mating plug (not shown) and adapted for engagement with the trailer harness circuit 37 and the trailer brake lamp circuit 38 as at connection 39.

In this manner the present invention may be adapted for use with an existing trailer 20 without modifications of the existing wiring harness.

In an alternative embodiment, the boat loading guidance device 10 may be self-powered utilizing dry battery cells (not shown) which are contained within a weather-resistant housing (not shown) and electrically connected to the circuit hereinabove described.

Referring again to FIG. 2, the target lamp 42 and the port and starboard indicator lamps 41 and 43 are integrated into the indicator lamp module 40 which is mounted high on a telescopically adjustable stanchion 45 which may be conveniently attached to the vertical tongue support column 28 of boat trailer 20 by means of a mounting bracket 19.

In practical use the guidance device 10 will be provided in kit form for attachment to an existing boat trailer 20 as shown in FIG. 1. The control box 13 together with the actuating arms 11 and the indicator lamp module 40 may be conveniently attached to the vertical tongue support column 28 found on many conventional boat trailers by use of mounting bracket 19.

Next, the actuating arms 11 are adjusted to position the same in the optimal locations for any particular boat 50 to be loaded on a trailer 20

In order to adapt the present invention to a variety of small boat configurations, the actuating arms 11 are made telescopingly adjustable. In this arrangement an internal segment 11' of arm 11 is adapted for sliding engagement within an external segment 11" as shown in FIG. 2.

Since such telescopically adjustable arm members are well known to those skilled in the art, further detailed discussion of the same is not deemed necessary.

In addition, the linear distance between the contact rollers 16 at the terminal ends of arms 11 is made adjustable by providing an adjustable strut indicated generally at 46, being transversely mounted between actuating arms 11 as shown in FIG. 4.

Strut 46 includes threaded rod 47 portions which are adapted for engagement with a mating internal thread formed within a tubular member 48 as shown in FIG. 2. In this arrangement, strut 46 maybe adjusted in length in the manner of a turnbuckle to position actuating arms 11 at the optimum distance apart to accommodate the shape of any given boat to used with the trailer 20 and the guidance device 10.

Next, the vertical position of the indicator lamp module 40 is set by adjusting the vertical height of stanchion 45. Module 40 must be positioned so as to permit unobstructed visibility to the boat operator to view the lamps 41, 42, and 43 easily.

Next, the boat trailer 20 is positioned on the boat landing ramp (not shown) so as to at least partially submerge the trailer 20 below the water in the normal procedure allowing the guidance device 10 to project upwardly in order to remain visible.

Thereafter, the main power switch 36 is turned on illuminating the target lamp 42 on the module 40 in an embodiment including such power switch 36.

Next, utilizing the target lamp 42 as a guide, the operator guides the boat 50 toward the front end of the trailer 20 and into longitudinal alignment therewith as shown in FIG. 2.

Should the boat be misaligned, for example, too far to the operator's left or to port, the bow will engage the port side contact roller 16 causing its respective switch 18 to be closed, thus illuminating the port indicator lamp 41, which is oriented to the operator's left. This indicates that the operator must maneuver to his right to be properly aligned.

Similarly, should the boat operator be too far to his right or to starboard, the bow will engage the right side or starboard contact roller 16, thus the switch 18 on the right or starboard side will be closed thus illuminating the starboard indicator lamp 43, which is oriented to the operator's right. This indicates that the operator must maneuver to his left to be properly aligned.

Once the operator has maneuvered the boat 50 into correct alignment with the trailer 20, the bow will simultaneously engage both the port and starboard contact rollers 16 on actuating arms 11 so as to illuminate both lamps 41 and 43.

Thereafter, the boat 50 can be secured on trailer 20 by known means and hauled from the water for transport.

From the above it can be seen that the present invention provides a simple boat loading guidance device which functions to signal the operator of a boat when the same has been maneuvered into correct longitudinal alignment with a submerged or partially submerged trailer.

Thus, the present invention enables a boat operator to maneuver a boat into correct alignment with the trailer without the assistance of a person on shore giving directions and also at night when visibility is limited.

Further, the boat loading guidance device can be provided as either original equipment or in kit form for convenient attachment to an existing boat trailer and is designed to be an add-on feature with no modifications or changes to the existing boat trailer wiring.

What is claimed is:

1. A boat loading guidance device for visually indicating the proper longitudinal alignment between a boat and a boat trailer, said device comprising:

a control box containing a main power switch and a pair of normally open blade switches;

a pair of elongated, actuating arms being angularly disposed at a front end of said trailer and adapted to engage a bow of said boat, said arms being pivotally mounted for horizontal movement toward said control box for independently actuating one of said blade switches when said bow contacts either of said arms in a predetermnined position;

spring biasing means extending transversely between said actuating arms and being, fixedly attached thereto such that said actuating arms are spring biased inwardly toward one another, said spring biasing means including adjustment means disposed in functional relation thereto permitting said actuating arms to be positioned at predeterminied minimum distance apart;

an indicator lamp module including a plurality of lamps corresponding to the number of said switches, said module being supported above the vertical height of said boat so as to visible to an operator of the same;

attachment meals for securing said control box, said actuating arms, and said module to said trailer; and electrical conducting means joining each of said lamps to one each of said switches to form a plurality of independent, parallel, normally open electrical circuits, said electrical conducting means further including:
  (a) power supply means connected to said plurality of circuits for supplying electrical power to said circuits, and
  (b) one of said circuits connected to one of said blade switches being closed upon the actuation of its associated blade switch due to movement of its associated actuating arm, whereby longitudinal alignment of said boat relative to said trailer is determined visually from said boat by the one of said lamps which is illuminated.

2. The boat loading guidance device of claim 1 wherein said control box includes a weather-resistant housing wherein said switches and a portion of said electrical conducting means are contained.

3. The boat loading guidance device of claim 1 wherein said attachment means includes mounting bracket means for mechanically coupling said control box and said stanchion together with said module to said trailer.

4. The boat loading guidance device of claim 1 wherein said power supply is a battery of a towing vehicle for said trailer.

5. The boat loading guidance device of claim 1 wherein said power supply means is a plurality of dry cell batteries connected to said plurality of said circuits for supplying electric power to said circuits.

6. A boat loading guidance device for visually indicating the proper longitudinal alignment between a boat and a boat trailer, said device comprising:

a control box containing a main power switch and a pair of normally open blade switches;

a pair of elongated, actuating arms being angularly disposed at a front end of said trailer and adapted to engage a bow of said boat, said actuating arms including contact roller means being pivotally attached at the terminal ends of each of said actuating arms and being adapted for horizontal rolling engagement with said bow of said boat, said arms being pivotally mounted for horizontal movement toward said control box for independently actuating one of said blade switches when said bow contacts either of said arms in a predetermined position;

an indicator lamp module including a plurality of lamps corresponding to the number of said switches, said module being supported above the vertical height of said boat so as to visible to an operator of the same;

attachment means for securing said control box, said actuating arms, and said module to said trailer; and electrical conducting means joining each of said lamps to one each of said switches to form a plurality of independent, parallel, normally open electrical circuits, sailed electrical conducting means further including:
(a) power supply means connected to said plurality of circuits for supplying electrical power to said circuits, and
(b) one of said circuits connected to one of said blade switches being closed upon the actuation of its associated blade switch due to movement of its associated actuating arm, whereby longitudinal alignment of said boat relative to said trailer is determined visually from said boat by the one of said lamps which is illuminated.

7. The boat loading guidance device of claim 6 wherein said power supply means is a battery of a towing vehicle of said trailer.

8. The boat loading guidance device of claim 6 wherein said power supply means is a plurality of dry cell batteries connected to said plurality of said circuits for supplying electric power to said circuits.

9. A boat loading guidance device for visually indicating the proper longitudinal alignment between a boat and a boat trailer, said device comprising:

a control box containing a main power switch and a pair of normally open blade switches;

a pair of elongated, actuating arms being angularly disposed at a front end of said trailer and adapted to engage a bow of said boat, said arms being pivotally mounted for horizontal movement toward said control box for independently actuating one of said blade switches when said bow contacts either of said arms in a predetermined position;

an indicator lamp module including a plurality of lamps corresponding to the number of said switches, said module being supported above the vertical height of said boat by a vertical stanchion secured to said trailer, said stanchion being telescopically adjustable to a sufficient vertical height above said trailer so as to remain above the water and visible to an operator of said boat when said trailer is at least partially submerged below said water;

attachment means for securing said control box, said actuating arms, and said module to said trailer; and electrical conducting means joining each of said lamps to one each of said switches to form a plurality of independent, parallel, normally open electrical circuits, said electrical conducting means further including:
(a) power supply means connected to said plurality of circuits for supplying electrical power to said circuits, and
(b) one of said circuits connected to one of said blade switches being closed upon the actuation of its associated blade switch due to movement of its associated actuating arm, whereby longitudinal alignment of said boat relative to said trailer is determined visually from said boat by the one of said lamps which is illuminated.

10. The boat loading guidance device of claim 9 wherein said power supply means is a battery of a towing vehicle for said trailer.

11. The boat loading guidance device of claim 9 wherein said power supply means is a plurality of dry cell batteries connected to said plurality of said circuits for supplying electric power to said circuits.

12. A method of longitudinally aligning a boat on a partially submerged trailer comprising the steps of:

providing a boat loading guidance system including a control box containing a pair of normally open blade switches, a pair of actuating arms being angularly disposed at a front end of said trailer and adapted to engage a bow of said boat, said arms being pivotally mounted for horizontal movement toward said control box for independently actuating one of said blade switches when said bow contacts either of said arms, spring biasing means extending transversely between said arms and being fixedly attached thereto such that said actuating arms are spring biased inwardly toward one another, and indicator lamp module being supported above the vertical height of said boat so as to be visible to an operator thereof, attachment means for securing said control box, said actuating arms, and said module to said trailer, and electrical conducting means connecting said module to said switches to form a plurality of normally open electrical circuits, said conducting means further including power supply means connected to said plurality of circuits, one of said circuits connected to one of said blade switches being closed upon the actuation thereof by movement of its associated actuating arm;

mounting said attachment means to said trailer at front end thereof such that said arms extend rearwardly and are disposed symmetrically in relation to a longitudinal axis of said trailer;

positioning said trailer on a boat loading ramp by use of a towing vehicle such that said trailer is partially submerged below water to permit said boat to be floated onto said trailer;

maneuvering sold boat into a position above said trailer such that the bow of said boat contacts either of said arms thereby illuminating a lamp on said module to indicate to said operator when said boat is left of said longitudinal alignment, right of longitudinal alignment, and in longitudinal alignment with said trailer whereby said operator may maneuver said boat into the proper position on said trailer without the assistance of another person.

* * * * *